United States Patent
Nakagawa

[11] 3,741,630
[45] June 26, 1973

[54] ULTRA-WIDE ANGLE PHOTOGRAPHIC LENS

[75] Inventor: Jihei Nakagawa, Tokyo, Japan

[73] Assignee: Olympus Optical Co., Ltd., Tokyo, Japan

[22] Filed: Nov. 5, 1971

[21] Appl. No.: 196,080

[52] U.S. Cl. ............... 350/214, 350/176, 350/215
[51] Int. Cl. ...................... G02b 9/62, G02b 9/62
[58] Field of Search ........................ 350/214, 215

[56] References Cited
UNITED STATES PATENTS
3,524,697   8/1970   Isshiki ..................... 350/215 UX Primary Examiner—John K. Corbin
Attorney—Kurt Kelman

[57] ABSTRACT

Ultra-wide angle photographic lens having a sufficiently long back focus suitable for use in a single lens reflex camera and consisting of six lens components of which the first to third lens components beginning at the object side are of negative power, the fourth, fifth and sixth lens components being of positive power, the second, third, fourth and sixth lens components consisting of cemented lens elements, while each of the first and fifth lens groups consists of a single lens element. The ultra-wide angle photographic lens satisfies the following conditions:

$$f < |f_{123}| < 2.5f \quad (1)$$

$$n_2 > n_3 \; ; \; 15f < r_4 < 35f \quad (2)$$

$$\nu_4 > \nu_5 \; ; \; f < r_7 < 3.5f \quad (3)$$

$$f < r_{15} < 3.5f \quad (4)$$

$$\nu_9 < 30; \; \nu_{10} > 50 \quad (5)$$

where:
- $f$ = focal length of the entire system
- $f_{123}$ = resultant focal length of the first to third lens components, inclusive
- $r_i, n_i, \nu_i$ = radius of curvature, refractive index and Abbe number, respectively, of each of the lens elements, $i$ beginning at the object side
- $d_i$ = thickness of the lens element and air gap, $i$ beginning at the objective side.

4 Claims, 4 Drawing Figures

ULTRA-WIDE ANGLE PHOTOGRAPHIC LENS

BACKGROUND OF THE INVENTION

The present invention relates to an ultra-wide angle photographic lens, and more particularly, to an ultra-wide angle high quality photographic lens (to be referred to as a fish-eye lens hereinbelow) which is compact in size and has an angle of field of 180°, a large aperture of F2,8 and a long back focus (the distance between the back lens and the image) so that the lens can be mounted in a single lens reflex camera without requiring to swing up the reflecting mirror of the camera thereby permitting the object to be observed through the finder of the camera when the lens is mounted.

The present invention is directed to improvements in the fish-eye lens.

SUMMARY OF THE INVENTION

The object of the present invention is to provide a novel and useful fish-eye lens which is compact in size and has an angle of field of 180°, an aperture of F2.8 and a long back focus sufficient to permit the lens to be mounted in a single lens reflex camera without requiring to swing up the reflecting mirror of the camera so that the object is observed through the view finder of the camera, and in which various aberrations are well compensated for.

The fish-eye lens of the present invention comprises a first lens component beginning at the object side consisting of a single negative meniscus with its convex surfaces directed to the object side, a second lens component consisting of two lens elements cemented to each other to form a negative meniscus as a whole with the convex surfaces thereof directed to the object, a third lens component consisting of two lens elements cemented to each other or closely spaced from each other by a small air gap so as to have a negative power as a whole, a fourth lens component consisting of two lens elements cemented to each other and having a positive power, a fifth lens component consisting of a single positive meniscus with its concave surfaces directed to the object side, and a sixth lens component consisting of two lens elements cemented to each other and having a positive power.

Since a fish-eye lens has normally a large negative distortion, the first to the third lens components are each made to have a heavy negative power in accordance with the present invention so as to make the back focus long while the aberrations can be well compensated for over the large angle of field of 180°. Further, cemented surfaces are provided in the second lens component having a large height of light rays in the oblique light bundle therethrough so that the compensation for the chromatic aberration of magnification is made effective, and the third lens component is constituted by substantially a hyperchromatic lens or two lens elements closely spaced from each other by a small air gap instead of the provision of the cemented surfaces of the hyperchromatic lens and the fourth lens component located at a position where the light bundle diverges is constituted by two lens elements cemented to each other, so that the compensation for the axial aberration is made effective, while the sixth lens component is constituted by two lens elements cemented to each other and each having Abbe number largely different from each other so that various aberrations are well compensated for. Particularly, in accordance with the characteristic feature of the present invention described above, the chromatic aberration of magnification can be well compensated for which is the serious problem in the compensation for the aberrations in a wide angle lens.

DETAILED DESCRIPTION OF THE PREFERRED EMBODIMENTS

Figures 1, 2A, 2B, 2C, 2D:
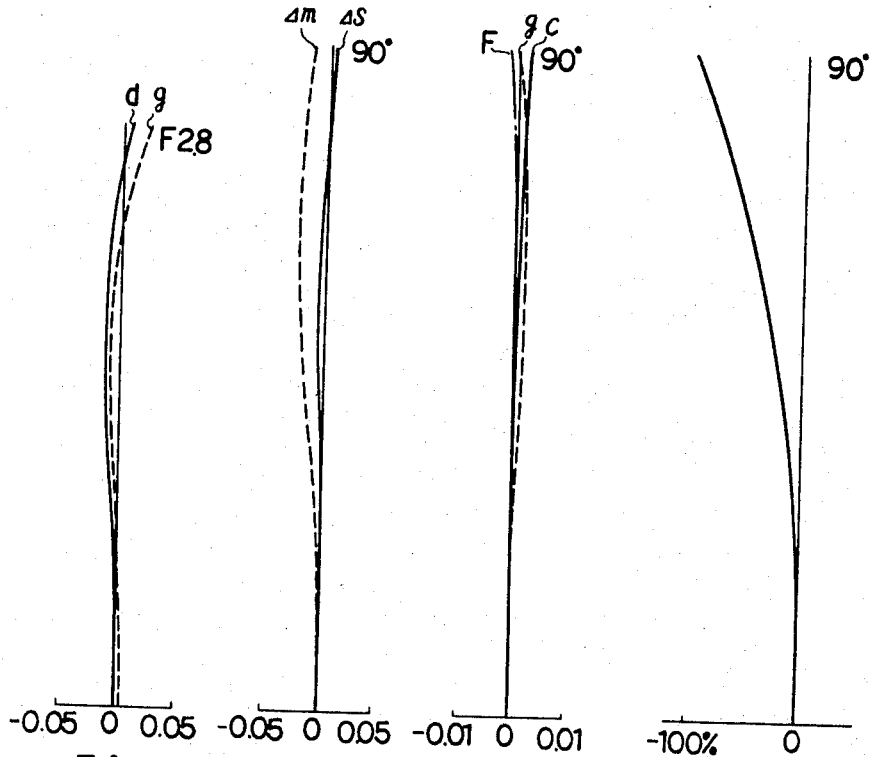
FIG. 1 is a longitudinal sectional view showing an embodiment of the fish-eye lens constructed in accordance with the present invention in which the third lens component is constituted by two lens elements cemented to each other.
FIGS. 2A–2D are diagrams showing respectively the spherical aberration the astigmatism, the chromatic aberration of magnification and the distortion of the fish-eye lens of FIG. 1.

Referring to FIG. 1, the first embodiment of the fish-eye lens of the preSent invention comprises six lens components of which the first lens component I beginning at the object side is a single negative meniscus with its convex surfaces directed to the object side, the second lens component II being two lens elements cemented to each other to form a negative meniscus as a whole with the convex surfaces thereof directed to the object side, the third lens component III being two lens elements cemented to each other to form a negative lens as a whole, the fourth lens component IV being two lens elements cemented to each other to form a positive lens as a whole, the fifth lens component V being a single positive meniscus with its concave surfaces directed to the object side, while the sixth lens component VI consists of two lens elements cemented to each other to form a positive lens as a whole.

The fish-eye lens of FIG. 1 satisfies the following conditions:

$$f < |f_{123}| < 2.5f \tag{1}$$

$$n_2 > n_3; \; 15f < r_4 < 35f \tag{2}$$

$$\nu_4 > \nu_5; \; f < r_7 < 3.5f \tag{3}$$

$$f < r_{15} < 3.5f \tag{4}$$

$$\nu_9 < 30 \; ; \; \nu_{10} > 50 \tag{5}$$

where:
 $f$ = the focal length of the entire system
 $f_{123}$ = the resultant focal length of the first to third lens components, inclusive $r_i$ ($i = 1 - 16$) = the radius of curvature of each of the lens elements, $i$ beginning at the object side $d_i$ ($i = 1 - 15$) = the thickness of each of the lens elements and the air gap between the adjacent lens elements, $i$ beginning at the object side $n_i$ ($i = 1 - 10$) = the refractive index of each of the lens elements, $i$ beginning at the object side $\nu_i$ ($i = 1 - 10$) = Abbe number of each of the lens elements, $i$ beginning at the object side As described previously, a fish-eye lens has usually a large negative distortion, and the first to the third lens components I to III of the fish-eye lens are each constituted by a lens component having a large negative power in accordance with the present invention, so that the back focus is made long while the compensation for the aberrations is made effective over the wide angle of field of 180°. Further, cemented surfaces are provided in the second lens component II so that the chromatic aberration of magnification is effectively compensated for. The third lens component III is constituted by a hyperchromatic lens while the fourth lens component IV is constituted by cemented lens elements, so that the axial aberration is effectively compensated for. The sixth sixth lens component VI is constituted by two lens elements cemented to each other and each having Abbe number greatly different from each other, thereby permitting various aberrations to be effectively compensated for.

Particularly, the chromatic aberration of magnification can be effectively compensated for in accordance with the present invention.

With regard to the condition (1) above, if the value $|f_{123}|$ is smaller than the value $f$, Petzval sum is made excessively large in the negative value, so that the aberration such as the curvature of field cannot be effectively compensated for, although the back focus can be made long. On the other hand, if the value $|f_{123}|$ is made greater than the value $2.5f$, it is made difficult to make the back focus long while non-axial aberrations can not be effectively compensated for over the wide angle of field of 180°.

Under the condition (1) above, it is desirable for effectively compensating for the aberrations that the cemented surfaces of the lens elements are made to have a positive power and that the convex side of the cemented surfaces is directed to the object side. To this end, the requirement $n_2 > n_3$ in the condition (2) is indispensable in the present invention. Further, if the value $r_4$ exceeds beyond the upper limit $35f$ or the lower limit $15f$ in the condition (2), a large spherical aberration and a large astigmatism will result and the compensation therefor is made difficult, particularly, in case the value $r_4$ is made smaller than $15f$, undercorrection of the chromatic aberration will result thereby making it difficult to appropriately compensate for the chromatic aberration.

The above condition (3) relates to the condition (2) and the condition (3) is necessary for the compensation for the chromatic aberration of magnification. Thus, by satisfying the requirements $\nu_4 > \nu_5, f < r_7 < 3.5f$ in accordance with the condition (3), the chromatic aberration of magnification which has been compensated for by the condition (2) can be further corrected. On the other hand, if $\nu_4 < \nu_5$, then the compensation for the axial chromatic aberration is made difficult and the chromatic aberration of magnification cannot be effectively compensated for. If the value $r_7$ is made smaller than the value $f$, overcorrection of the chromatic aberration of magnification will result, while remarkable undercorrection of the chromatic aberration of magnification will result, if the value $r_7$ is made greater than $3.5f$.

The condition (4), i.e., the limitation of the value $r_{15}$ within the range of $f$ and $3.5f$, is indispensable for the compensation for the spherical aberration, astigmatism and the coma. If the value $r_{15}$ is made smaller than the value $f$, then these aberrations are made excessively large, whereas the reverse conditions are generated when the value $r_{15}$ is made greater than the value $3.5f$, thereby making it difficult to appropriately eliminating these aberrations.

With regard to the condition (5), if the value $\nu_9$ is made greater than 30 while the value $\nu_{10}$ is made smaller than 50, undercorrection of axial chromatic aberrations and the chromatic aberration of magnification will take place so that the compensation for the aberration is made difficult. Therefore, the condition (5) is indispensable in the present invention.

Following table 1 shows an example according to the first embodiment of the present invention.

TABLE 1

| | | | | | | |
|---|---|---|---|---|---|---|
| $r_1$ | 11.8788 | $d_1$ | 0.3404 | | | |
| | | | | $n_1$ | 1.5891 $\nu_1$ | 61.0 |
| $r_2$ | 2.5106 | $d_2$ | 2.3830 | | | |
| $r_3$ | 8.4135 | $d_3$ | 0.5167 | | | |
| | | | | $n_2$ | 1.7847 $\nu_2$ | 25.6 |
| $r_4$ | 18.4891 | $d_4$ | 0.2432 | | | |
| | | | | $n_3$ | 1.5891 $\nu_3$ | 61.0 |
| $r_5$ | 2.1550 | $d_5$ | 1.7556 | | | |
| $r_6$ | −37.9278 | $d_6$ | 0.1945 | | | |
| | | | | $n_4$ | 1.67 $\nu_4$ | 57.3 |
| $r_7$ | 2.1550 | $d_7$ | 0.5957 | | | |
| | | | | $n_5$ | 1.6668 $\nu_5$ | 33.0 |
| $r_8$ | 12.2238 | $d_8$ | 1.0057 | | | |
| $r_9$ | 18.9741 | $d_9$ | 0.2432 | | | |
| | | | | $n_6$ | 1.7865 $\nu_6$ | 50.1 |
| $r_{10}$ | 1.3584 | $d_{10}$ | 0.8377 | | | |
| | | | | $n_7$ | 1.6032 $\nu_7$ | 42.3 |
| $r_{11}$ | −5.6012 | $d_{11}$ | 1.5210 | | | |
| $r_{12}$ | −7.7271 | $d_{12}$ | 0.5678 | | | |
| | | | | $n_8$ | 1.5173 $\nu_8$ | 69.3 |
| $r_{13}$ | −3.1809 | $d_{13}$ | 0.0243 | | | |
| $r_{14}$ | 3.3374 | $d_{14}$ | 0.1824 | | | |
| | | | | $n_9$ | 1.9229 $\nu_9$ | 20.9 |
| $r_{15}$ | 2.0547 | $d_{15}$ | 0.6237 | | | |
| | | | | $n_{10}$ | 1.5173 $\nu_{10}$ | 69.3 |
| $r_{16}$ | −3.6401 | | | | | |

$f = 1.0; f_{123} = -1.545f$

Back focus $f_B = 4.5855$

As is clear, the fish-eye lens has a sufficiently long back focus.

The spherical aberration, the astigmatism, the chromatic aberration of magnification and the distortion of the above embodiment are shown in FIG. 2. As shown in FIG. 2, it is apparent that the aberrations are well compensated for.

Figure 4:
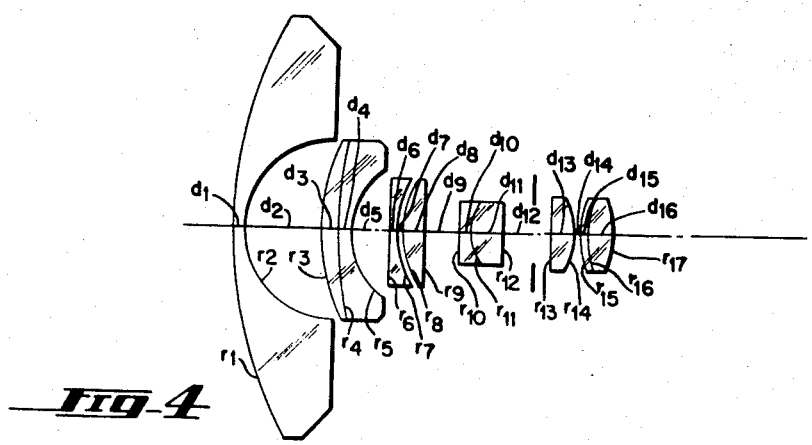
FIG. 4 is a longitudinal sectional view showing the second embodiment of the fish-eye lens wherein the third lens component is constituted by two lens elements closely spaced from each other by a small air gap.

In accordance with another feature of the present invention, the third lens component may be modified so that it consists of two lens elements closely spaced from each other by a small air gap, noting FIG. 4. The third lens component of the second embodiment effects substantially the same function as that of the previously described first embodiment of the present invention.

In this case, the fish-eye lens of FIG. 4 must satisfy the following conditions:

$$f < |f_{123}| < 2.5f \qquad (1)$$

$$n_2 > n_3; \quad 15f < r_4 < 35f \qquad (2)$$

$$\nu_4 > \nu_5; f < r_7; r_8 < 3.5f \qquad (3)$$

$$f < r_{16} < 3.5f \qquad (4)$$

$$\nu_9 < 30;\ \nu_{10} > 50 \quad (5)$$

where:

$f$ = the focal length of the entire system $f_{123}$ = the resultant focal length of the first to third lens components, inclusive $r_i$ ($i = 1 - 17$) = the radius of curvature of each of the lens elements, $i$ beginning at the object side $d_i$ ($i = 1 - 16$) = the thickness of each of the lens elements and the air gap between the adjacent lens elements, $i$ beginning at the object side $n_i$ ($i = 1 - 10$) = the refractive index of each of the lens elements, $i$ beginning at the object side $\nu_i$ ($i = 1 - 10$) — Abbe number of each of the lens elements, $i$ beginning at the object side The reasons for setting the above conditions (1) to (5) in the second embodiment are similar to those for the first embodiment previously described so that the detailed description therefor is not necessary here.

Following table 2 shows an example in accordance with the second embodiment of the present invention.

TABLE 2

| | | | | | | |
|---|---|---|---|---|---|---|
| $r_1$ | 12.5508 | $d_1$ | 0.3406 | | | |
| | | | | $n_1$ | 1.5891 $\nu_1$ | 61.0 |
| $r_2$ | 2.3973 | $d_2$ | 2.0581 | | | |
| $r_3$ | 6.7504 | $d_3$ | 0.4841 | | | |
| $n_2$ | | | | | 1.7847 $\nu_2$ | 25.6 |
| $r_4$ | 23.0172 | $d_4$ | 0.2433 | | | |
| $n_3$ | | | | | 1.5891 $\nu_3$ | 6.10 |
| $r_5$ | 2.0662 | $d_5$ | 1.0668 | | | |
| $r_6$ | −30.4548 | $d_6$ | 0.1910 | | | |
| $r_7$ | 2.7598 | $d_7$ | 0.0255 | | | |
| $n_4$ | | | | | 1.67 $\nu_4$ | 57.3 |
| $r_8$ | 3.0080 | $d_8$ | 0.5681 | | | |
| | | | | $n_5$ | 1.6668 $\nu_5$ | 33.0 |
| $r_9$ | −40.5882 | $d_9$ | 0.8687 | | | |
| $r_{10}$ | −10.6177 | $d_{10}$ | 0.2433 | | | |
| $n_6$ | | | | | 1.7865 $\nu_6$ | 50.1 |
| $r_{11}$ | 1.0641 | $d_{11}$ | 0.8722 | | | |
| | | | | $n_7$ | 1.6034 $\nu_7$ | 38.0 |
| $r_{12}$ | −8.5301 | $d_{12}$ | 1.2638 | | | |
| $r_{13}$ | −82.8154 | $d_{13}$ | 0.5340 | | | |
| | | | | $n_8$ | 1.5184 $\nu_8$ | 60.1 |
| $r_{14}$ | −3.1680 | $d_{14}$ | 0.0243 | | | |
| $r_{15}$ | 3.2395 | $d_{15}$ | 0.1825 | | | |
| | | | | $n_9$ | 1.9225 $\nu_9$ | 20.9 |
| $r_{16}$ | 1.8270 | $d_{16}$ | 0.7992 | | | |
| | | | | $n_{10}$ | 1.5184 $\nu_{10}$ | 60.1 |
| $r_{17}$ | −2.8557 | | | | | |

$$f = 1.0\ ;\ f_{123} = -2.04f$$

Back focus $F_B = 4.5616$

As is clear, the fish-eye lens has a sufficiently long back focus.

Figures 3A, 3B, 3C, 3D:
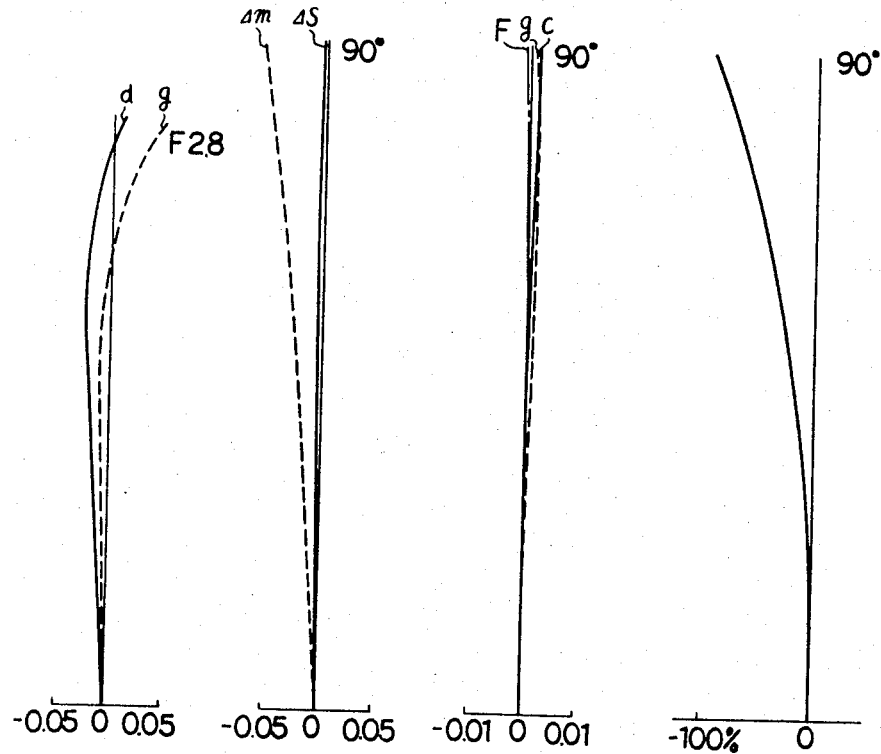
FIGS. 3A–3D are diagrams similar to FIG. 2 but showing the aberrations of the second embodiment of the present invention in which the third lens component is constituted by two lens elements closely spaced from each other by a small air gap.

The spherical aberration, the astigmatism, the chromatic aberration of magnification and the distortion of the fish-eye lens of the above table 2 are shown in FIG. 3. As shown, it is apparent that these aberrations are well compensated for.

I claim:

1. In an ultra-wide angle photographic lens consisting of six lens components, the improvement wherein the first lens component beginning at the object side is a single negative meniscus with its convex surfaces directed to the object side, the second lens component consisting of two lens elements cemented to each other to form a negative meniscus as a whole with the convex surfaces thereof directed to the object side, the third lens component consisting of two lens elements cemented to each other to form a negative lens as a whole, the fourth lens component consisting of two lens elements, a positive and a negative cemented to each other to form a positive lens as a whole, the fifth lens component consisting of a single positive meniscus with its concave surfaces directed to the object side, while the sixth lens component consists of two lens elements cemented to each other to form a positive lens as a whole, said photographic lens satisfying the following conditions:

$$f < |f_{123}| < 2.5f \quad (1)$$

$$n_2 > n_3\ ;\ 15f < r_4 < 35f \quad (2)$$

$$\nu_4 > \nu_5\ ;\ f < r_7 < 3.5f \quad (3)$$

$$f < r_{15} < 3.5f \quad (4)$$

$$\nu_9 < 30\ ;\ \nu_{10} > 50 \quad (5)$$

where:

$f$ = resultant focal length of the entire system $f_{123}$ = resultant focal length of the first, the second and the third lens components inclusive $r_i$ ($i = 1 - 16$) = the radius of curvature of each of the surfaces of the lens elements, $i$ beginning at the object side $d_i$ ($i = 1 - 15$) = the thickness of each of the lens elements and the air gap between the adjacent lens elements, $i$ beginning at the object side $n_i$ ($i = 1 - 10$) = the refractive index of each of the lens elements, $i$ beginning at the object side $\nu_i$ ($i = 1 - 10$) = Abbe number of each of the lens elements, $i$ beginning at the object side.

2. Ultra-wide angle photographic lens according to claim 1, which satisfies the following numerical data:

| | | | | | | |
|---|---|---|---|---|---|---|
| $r_1$ | 11.8788 | $d_1$ | 0.3404 | | | |
| | | | | $n_1$ | 1.5891 $\nu_1$ | 61.0 |
| $r_2$ | 2.5106 | $d_2$ | 2.3830 | | | |
| $r_3$ | 8.4135 | $d_3$ | 0.5167 | | | |
| | | | | $n_2$ | 1.7847 $\nu_2$ | 25.6 |
| $r_4$ | 18.4891 | $d_4$ | 0.2432 | | | |
| | | | | $n_3$ | 1.5891 $\nu_3$ | 61.0 |
| $r_5$ | 2.1550 | $d_5$ | 1.7556 | | | |
| $r_6$ | −37.9278 | $d_6$ | 0.1945 | | | |
| | | | | $n_4$ | 1.67 $\nu_4$ | 57.8 |
| $r_7$ | 2.1550 | $d_7$ | 0.5957 | | | |
| | | | | $n_5$ | 1.6668 $\nu_5$ | 33.0 |
| $r_8$ | 12.2238 | $d_8$ | 1.0057 | | | |
| $r_9$ | 18.9741 | $d_9$ | 0.2432 | | | |
| | | | | $n_6$ | 1.7865 $\nu_6$ | 50.1 |
| $r_{10}$ | 1.3584 | $d_{10}$ | 0.8377 | | | |
| | | | | $n_7$ | 1.6032 $\nu_7$ | 42.3 |
| $r_{11}$ | −5.6012 | $d_{11}$ | 1.5210 | | | |
| $r_{12}$ | −7.7271 | $d_{12}$ | 0.5678 | | | |
| | | | | $n_8$ | 1.5173 $\nu_8$ | 69.3 |
| $r_{13}$ | −3.1809 | $d_{13}$ | 0.0243 | | | |
| $r_{14}$ | 3.3374 | $d_{14}$ | 0.1824 | | | |
| | | | | $n_9$ | 1.9229 $\nu_9$ | 20.9 |
| $r_{15}$ | 2.0547 | $d_{15}$ | 0.6237 | | | |
| | | | | $n_{10}$ | 1.5173 $\nu_{10}$ | 69.3 |
| $r_{16}$ | −3.6401 | | | | | |

$$f = 1.0\ ;\ f_{123} = -1.545f$$

Back Focus $f_B = 4.5855$.

3. In an ultra-wide angle photographic lens consisting of six lens components, the improvement wherein the first lens component beginning at the object side is a single negative meniscus with its convex surfaces directed to the object side, the second lens component consisting of two lens elements, a positive and a negative cemented to each other to form a negative meniscus as a whole with the convex surfaces thereof directed to the object side, the third lens component consisting of two lens elements closely spaced from each other by a small air gap to provide a negative power as a whole, the fourth lens component consisting of two lens elements cemented to each other to form a positive lens as a whole, the fifth lens component consisting of a single positive meniscus with its concave surfaces directed to the object side, while the sixth lens component consists of two lens elements cemented to each other to form a positive lens as a whole, said photographic lens satisfying the following conditions:

$$f < |f_{123}| < 2.5f \quad (1)$$

$$n_2 > n_3 \ ; \ 15f < r_4 < 35f \quad (2)$$

$$\nu_4 > \nu_5 \ ; \ f < r_7 \ ; \ r_8 < 3.5f \quad (3)$$

$$f < r_{16} < 3.5f \quad (4)$$

$$\nu_9 < 30 \ ; \ \nu_{10} > 50 \quad (5)$$

where:
$f$ = resultant focal length of the entire system
$f_{123}$ = resultant focal length of the first, the second and the third lens components, inclusive
$r_i$ ($i = 1$ --- $17$) = the radius of curvature of each of the surfaces of the lens elements, $i$ beginning at the object side
$d_i$ ($i = 1 - 16$) = the thickness of each of the lens elements and the air gap between the adjacent lens elements, $i$ beginning at the object side
$n_i$ ($i = 1 - 10$) = the refractive index of each of the lens elements, $i$ beginning at the object side
$\nu_i$ ($i = 1 - 10$) = Abbe number of each of the lens elements, $i$ beginning at the object side 4. Ultra-wide angle photographic lens according to claim 3, which satisfies the following numerical data:

| | | | | | | | |
|---|---|---|---|---|---|---|---|
| $r_1$ | 12.5508 | $d_1$ | 0.3406 | | | | |
| | | | | $n_1$ | 1.5891 | $\nu_1$ | 61.0 |
| $r_2$ | 2.3973 | $d_2$ | 2.0581 | | | | |
| $r_3$ | 6.7504 | $d_3$ | 0.4841 | | | | |
| | | | | $n_2$ | 1.7847 | $\nu_2$ | 25.6 |
| $r_4$ | 23.0172 | $d_4$ | 0.2433 | | | | |
| | | | | $n_3$ | 1.5891 | $\nu_3$ | 61.0 |
| $r_5$ | 2.0662 | $d_5$ | 1.0668 | | | | |
| $r_6$ | −30.4548 | $d_6$ | 0.1910 | | | | |
| | | | | $n_4$ | 1.67 | $\nu_4$ | 57.3 |
| $r_7$ | 2.7598 | $d_7$ | 0.0255 | | | | |
| $r_8$ | 3.0080 | $d_8$ | 0.5681 | | | | |
| | | | | $n_5$ | 1.6668 | $\nu_5$ | 33.0 |
| $r_9$ | −40.5882 | $d_9$ | 0.8687 | | | | |
| $r_{10}$ | −10.6177 | $d_{10}$ | 0.2433 | | | | |
| | | | | $n_6$ | 1.7865 | $\nu_6$ | 50.1 |
| $r_{11}$ | 1.0641 | $d_{11}$ | 0.8722 | | | | |
| | | | | $n_7$ | 1.6034 | $\nu_7$ | 38.0 |
| $r_{12}$ | −8.5301 | $d_{12}$ | 1.2638 | | | | |
| $r_{13}$ | −82.8154 | $d_{13}$ | 0.5340 | | | | |
| | | | | $n_8$ | 1.5184 | $\nu_8$ | 60.1 |
| $r_{14}$ | −3.1680 | $d_{14}$ | 0.0243 | | | | |
| $r_{15}$ | 3.2395 | $d_{15}$ | 0.1825 | | | | |
| | | | | $n_9$ | 1.9229 | $\nu_9$ | 20.9 |
| $r_{16}$ | 1.8270 | $d_{16}$ | 0.7992 | | | | |
| | | | | $n_{10}$ | 1.5184 | $\nu_{10}$ | 60.1 |
| $r_{17}$ | −2.8557 | | | | | | |

$$f = 1.0 \ ; \ f_{123} = -2.04f$$

Back Focus $f_B = 4.5616$.

* * * * *